US012742912B2

(12) United States Patent
Shirato et al.

(10) Patent No.: US 12,742,912 B2
(45) Date of Patent: Sep. 22, 2026

(54) ANTI-FOGGING COMPOSITION

(71) Applicant: KOBAYASHI PHARMACEUTICAL CO., LTD., Osaka (JP)

(72) Inventors: Makoto Shirato, Ibaraki (JP); Anna Shigaki, Ibaraki (JP); Karishma Vadsariya, Dalton, GA (US)

(73) Assignee: Kobayashi Pharmaceutical Co., Ltd., Osaka (JP)

( * ) Notice: Subject to any disclaimer, the term of this patent is extended or adjusted under 35 U.S.C. 154(b) by 984 days.

(21) Appl. No.: 18/048,258

(22) Filed: Oct. 20, 2022

(65) Prior Publication Data

US 2023/0130538 A1 Apr. 27, 2023

Related U.S. Application Data

(60) Provisional application No. 63/262,901, filed on Oct. 22, 2021.

(51) Int. Cl.
*G02B 1/14* (2015.01)
*C09D 4/00* (2006.01)

(52) U.S. Cl.
CPC .................................... *G02B 1/14* (2015.01); *C09D 4/00* (2013.01)

(58) Field of Classification Search
CPC ... G02B 1/14; G02B 1/18; C09D 7/20; C09D 7/63; C09D 4/00; C09D 5/00; C09D 171/02; C08G 65/2609; C08G 65/2639; C08K 5/06; C08L 71/02
USPC .......................................................... 428/690
See application file for complete search history.

(56) References Cited

U.S. PATENT DOCUMENTS

2017/0240786 A1 8/2017 Gouda et al.
2017/0247639 A1 8/2017 Gouda et al.
2019/0056529 A1* 2/2019 Zhu .................. B29D 11/00865

FOREIGN PATENT DOCUMENTS

JP 2000-303027 A 10/2000
JP 2018-150470 A 9/2018
JP 2019-026667 A 2/2019
JP 2019-026668 A 2/2019
JP 2020-164842 A 10/2020
WO WO 2016/043282 A1 3/2016
WO WO 2016/043283 A1 3/2016
WO WO 2020/044788 A1 3/2020

OTHER PUBLICATIONS

International Search Report for PCT/JP2022/039183 dated Dec. 20, 2022 (in 3 pages).

* cited by examiner

*Primary Examiner* — James D Sells
(74) *Attorney, Agent, or Firm* — Knobbe, Martens, Olson & Bear, LLP

(57) ABSTRACT

An anti-fogging agent composition that can impart excellent anti-fogging properties to a hard surface of an eyewear lens or the like, and can be uniformly applied. An anti-fogging agent composition comprising a fluorosurfactant and a glycol ether, wherein the content of the glycol ether is 10 wt % or less.

8 Claims, 1 Drawing Sheet

EVALUATION CRITERIA : AA A B C

LEFT SIDE OF LENS: REGION COATED WITH ANTI-FOGGING COMPOSITION
RIGHT SIDE OF LENS: REGION UNCOATED WITH ANTI-FOGGING COMPOSITION

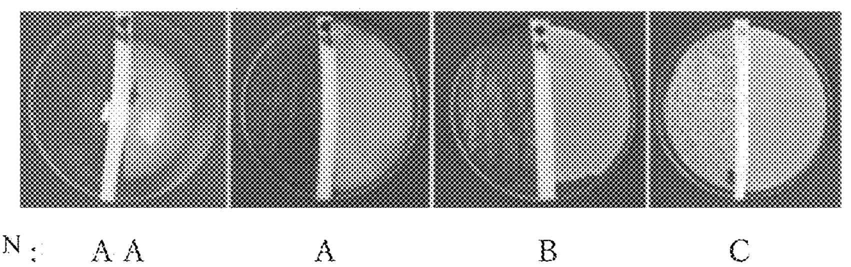
EVALUATION CRITERIA : 
A A
A
B
C
LEFT SIDE OF LENS: REGION COATED WITH ANTI-FOGGING COMPOSITION
RIGHT SIDE OF LENS: REGION UNCOATED WITH ANTI-FOGGING COMPOSITION

ANTI-FOGGING COMPOSITION

TECHNICAL FIELD

The present invention relates to an anti-fogging agent composition that can impart excellent anti-fogging properties to a hard surface of an eyewear lens or the like, and can be uniformly applied.

BACKGROUND ART

Fogging phenomenon (formation of fog) occurs on surfaces of plastic or glass articles when moisture in the air that turns into fine water droplets due to changes in temperature or humidity and is attached thereto. Fogging phenomenon that occurs on transparent materials, such as eyeglass lenses or sunglass lenses, not only causes inconvenience in daily life, but can also be dangerous in some situations. Thus, various anti-fogging agent compositions that can impart anti-fogging properties to hard surfaces have been previously developed.

For example, Patent Literature 1 describes an anti-fogging agent for an eyeglass lens obtained by dissolving 1.0 to 3.0 wt % of a nonionic fluorosurfactant, 1.0 to 3.0 wt % of a cationic fluorosurfactant, and 0.02 to 0.5 wt % of a perfluoroalkyl group-containing silicone compound in a mixture of water and a lower alcohol. Patent Literature 2 describes an anti-fog agent comprising an amphoteric fluorosurfactant or an anionic fluorosurfactant and a nonionic fluorosurfactant. Patent Literature 3 describes an anti-fog agent comprising an amphoteric fluorosurfactant, an anionic fluorosurfactant or a cationic fluorosurfactant, and a non-fluorinated amphoteric surfactant.

While some of the previously reported anti-fogging agent compositions exhibit excellent anti-fogging effect, there is a need for the development of a new anti-fogging agent composition for the diversification of formulations, for example.

CITATION LIST

Patent Literature

Patent Literature 1: JP 7-20411 A
Patent Literature 2: JP 2016-60878 A
Patent Literature 3: JP 2016-60879 A

SUMMARY OF INVENTION

Technical Problem

It is an object of the present invention to provide an anti-fogging agent composition that can impart excellent anti-fogging properties to a hard surface of an eyewear lens or the like, and can be uniformly applied.

Solution to Problem

As a result of extensive research to solve the above-described problem, the present inventors have found that an anti-fogging agent composition comprising a fluorosurfactant and a glycol ether, wherein the content of the glycol ether is 10 wt % or less, can impart excellent anti-fogging properties to a hard surface of an eyewear lens or the like, and can be uniformly applied to the hard surface. The present invention has been completed as a result of further research based on this finding.

In summary, the present invention provides the following embodiments of the invention.

Item 1. An anti-fogging agent composition comprising a fluorosurfactant and a glycol ether, wherein the content of the glycol ether is 10 wt % or less.

Item 2. The anti-fogging agent composition according to item 1, wherein the glycol ether is at least one member selected from the group consisting of monoalkylene glycol monoalkyl ethers, esters of monoalkylene glycol monoalkyl ethers, polyalkylene glycol monoalkyl ethers, monoalkylene glycol monoaryl ethers, and polyalkylene glycol dialkyl ethers.

Item 3. The anti-fogging agent composition according to item 1 or 2, wherein the content of the fluorosurfactant is 0.1 to 20 wt %.

Item 4. The anti-fogging agent composition according to any one of items 1 to 3, wherein the composition further contains a monohydric lower alcohol.

Item 5. The anti-fogging agent composition according to item 4, wherein the monohydric lower alcohol is isopropanol and/or ethanol.

Item 6. The anti-fogging agent composition according to any of items 1 to 5, wherein the composition has a surface tension at 25° C. of 30.0 mN/m or less.

Item 7. The anti-fogging agent composition according to any one of items 1 to 6, wherein the composition is applied to an eyewear lens.

Item 8. A sheet for anti-fogging comprising the anti-fogging agent composition according to any one of items 1 to 7 and a base sheet, wherein the base sheet is impregnated with the anti-fogging agent composition.

Item 9. The sheet for anti-fogging according to item 8, which is applied to an eyewear lens.

Item 10. A method of preventing fogging on a hard surface, comprising applying the anti-fogging agent composition according to any one of items 1 to 5 to the hard surface.

Item 11. The method of preventing fogging on a hard surface according to item 10, wherein the hard surface is that of an eyewear lens.

Item 12. Use of a composition comprising a fluorosurfactant and a glycol ether, wherein the content of the glycol ether is 10 wt % or less, for imparting anti-fogging properties to a hard surface.

Advantageous Effects of Invention

According to the present invention, there is provided an anti-fogging agent composition that can impart excellent anti-fogging properties to a hard surface of an eyewear lens or the like, and can be uniformly applied.

BRIEF DESCRIPTION OF DRAWING

FIG. 1 shows photographs of the observed appearances of lenses that meet the respective evaluation criteria for the anti-fogging effect.

DESCRIPTION OF EMBODIMENTS

1. Anti-Fogging Agent Composition

An anti-fogging agent composition of the present invention comprises a fluorosurfactant and a glycol ether, wherein the content of the glycol ether is 10 wt % or less. The anti-fogging agent composition of the present invention will be hereinafter described in detail.

[Fluorosurfactant]

The anti-fogging agent composition of the present invention contains a fluorosurfactant. The term "fluorosurfactant" refers to a surfactant with a fluoroalkyl or fluoroalkenyl group in the molecule.

While the fluoroalkyl or fluoroalkenyl group in the fluorosurfactant used herein is not limited in type, examples include perfluoroalkyl groups, polyfluoroalkyl groups in which some of the hydrogen atoms are replaced with fluorine atoms, perfluoroalkenyl groups, and polyfluoroalkenyl groups in which some of the hydrogen atoms are replaced with fluorine atoms; and preferred are perfluoroalkyl groups, polyfluoroalkyl groups in which some of the hydrogen atoms are replaced with fluorine atoms, and perfluoroalkenyl groups. The fluoroalkyl or fluoroalkenyl group in the fluorosurfactant may be either linear or branched. The number of carbon atoms in the fluoroalkyl or fluoroalkenyl group in the fluorosurfactant is, for example, 3 to 20, and preferably 3 to 10, although not limited thereto.

The fluorosurfactant used herein is not limited in type, and may be any of nonionic fluorosurfactants, cationic fluorosurfactants, anionic fluorosurfactants, and amphoteric fluorosurfactants.

Specific examples of nonionic fluorosurfactants include fluoroalkyl ethylene oxide adducts, fluoroalkylamine oxides, oligomers with fluoroalkyl groups and hydrophilic and/or lipophilic groups, fluoroalkenyl ethylene oxide adducts, fluoroalkenylamine oxides, and oligomers with fluoroalkenyl groups and hydrophilic and/or lipophilic groups. Preferred among these nonionic fluorosurfactants are fluoroalkyl ethylene oxide adducts and fluoroalkenyl ethylene oxide adducts, and more preferred are polyfluoroalkyl ethylene oxide adducts and perfluoroalkenyl ethylene oxide adducts.

Specific examples of cationic fluorosurfactants include quaternary ammonium salt fluorosurfactants, such as fluoroalkyl trimethylammonium salts, difluoroalkyl dimethyl ammonium salts, fluoroalkyl dimethylbenzylammonium salts, fluoroalkenyl trimethylammonium salts, difluoroalkenyl dimethyl ammonium salts, and fluoroalkenyl dimethylbenzylammonium salts. Preferred among these cationic fluorosurfactants are fluoroalkenyl trimethylammonium salts, and more preferred are perfluoroalkenyl trimethylammonium salts.

Specific examples of anionic fluorosurfactants include fluoroalkyl sulfonates, fluoroalkyl carboxylates, fluoroalkyl phosphates, fluoroalkenyl sulfonates, fluoroalkenyl carboxylates, and fluoroalkenyl phosphates.

Specific examples of amphoteric fluorosurfactants include betaine fluorosurfactants, such as fluoroalkyl dimethyl betaines and fluoroalkenyl dimethyl betaines; and amino acid fluorosurfactants, such as fluoroalkyl aminopropionates and fluoroalkenyl aminopropionates.

These fluorosurfactants may be used alone or in combination.

The content of the fluorosurfactant in the anti-fogging agent composition of the present invention is, for example, 0.01 to 20 wt %, preferably 0.01 to 10 wt %, more preferably 0.05 to 5 wt %, and even more preferably 0.1 to 5 wt %.

[Glycol Ether]

The anti-fogging agent composition of the present invention contains 10 wt % or less of a glycol ether. The use of a fluorosurfactant in combination with 10 wt % or less of a glycol ether can impart excellent anti-fogging properties and application uniformity to the composition.

A glycol ether is a compound in which alkyl or aryl group(s) is ether-linked to a glycol.

The number of carbon atoms in the alkyl group attached to the glycol ether is, for example, 1 to 3, preferably 1 or 2, and more preferably 1, although not limited thereto. The alkyl group attached to the glycol ether may be either linear or branched. While the aryl group attached to the glycol ether is not limited in type, examples include phenyl, benzyl, tolyl, and xylyl groups.

The glycol ether used herein is not limited in type, and may be, for example, any of monoalkylene glycol monoalkyl ethers, monoalkylene glycol dialkyl ethers, esters of monoalkylene glycol monoaryl ethers, monoalkylene glycol diaryl ethers, polyalkylene glycol monoalkyl ethers, esters of polyalkylene glycol monoalkyl ethers, polyalkylene glycol monoaryl ethers, esters of polyalkylene glycol monoaryl ethers, and polyalkylene glycol diaryl ethers. Preferred among these glycol ethers are monoalkylene glycol monoalkyl ethers and polyalkylene glycol monoalkyl ethers, from the viewpoint of imparting superior anti-fogging properties and application uniformity.

Specific examples of monoalkylene glycol monoalkyl ethers include ethylene glycol monoalkyl ethers, such as ethylene glycol monomethyl ether, ethylene glycol monoethyl ether, and ethylene glycol monopropyl ether; and propylene glycol monoalkyl ethers, such as propylene glycol monomethyl ether, propylene glycol monoethyl ether, and propylene glycol monopropyl ether. Preferred among these monoalkylene glycol monoalkyl ethers are propylene glycol monomethyl ether and propylene glycol monopropyl ether, and more preferred is propylene glycol monomethyl ether.

Specific examples of polyalkylene glycol monoalkyl ethers include diethylene glycol monoalkyl ethers, such as diethylene glycol monomethyl ether, diethylene glycol monoethyl ether, and diethylene glycol monopropyl ether; dipropylene glycol monoalkyl ethers, such as dipropylene glycol monomethyl ether, dipropylene glycol monoethyl ether, and dipropylene glycol monopropyl ether; triethylene glycol monoalkyl ethers, such as triethylene glycol monomethyl ether, triethylene glycol monoethyl ether, and triethylene glycol monopropyl ether; and tripropylene glycol monoalkyl ethers, such as tripropylene glycol monomethyl ether, tripropylene glycol monoethyl ether, and tripropylene glycol monopropyl ether. Of these polyalkylene glycol monoalkyl ethers, preferred are dipropylene glycol monomethyl ether and tripropylene glycol monomethyl ether, and more preferred is dipropylene glycol monomethyl ether.

These glycol ethers may be used alone or in combination.

The content of the glycol ether in the anti-fogging agent composition of the present invention is not limited as long as it is above 0 wt % and 10 wt % or less; however, from the viewpoint of imparting superior anti-fogging properties and application uniformity, the content of the glycol ether is, for example, 0.1 to 10 wt %, preferably 0.5 to 10 wt %, and more preferably 0.5 to 5 wt %. If the content of the glycol ether is above 10 wt %, the composition cannot have excellent anti-fogging properties and application uniformity.

In the anti-fogging agent composition of the present invention, the ratio of the glycol ether to the fluorosurfactant is, for example, 10 to 2000 wt parts of the glycol ether to 100 wt parts of the fluorosurfactant, although not limited thereto. From the viewpoint of imparting superior anti-fogging properties and application uniformity, the ratio of the glycol ether to 100 wt parts of the fluorosurfactant is preferably 15 to 1500 wt parts, more preferably 20 to 1000 wt parts, even more preferably 30 to 700 wt parts, and particularly preferably 35 to 500 wt parts.

[Monohydric Lower Alcohol]

The anti-fogging agent composition of the present invention may optionally contain a monohydric lower alcohol. The inclusion of a monohydric lower alcohol can not only impart excellent anti-fogging properties to a hard surface, but can also improve the effect of removing contaminants on the hard surface.

The term "monohydric lower alcohol" refers to a monohydric alcohol with 1 to 5 carbon atoms, specifically, for example, methanol, ethanol, 1-propanol, isopropyl alcohol, 1-butanol, 2-butanol, isobutanol, and t-butanol. Of these monohydric lower alcohols, preferred are ethanol and isopropyl alcohol, and more preferred is isopropyl alcohol. When the anti-fogging agent composition of the present invention is applied to an eyewear lens, the inclusion of isopropyl alcohol can significantly improve the effect of removing contaminants attached to the eyewear lens.

These monohydric lower alcohols may be used alone or in combination.

When the anti-fogging agent composition of the present invention contains a monohydric lower alcohol, the content of the monohydric lower alcohol is, for example, 1 to 90 wt %, preferably 5 to 60 wt %, and more preferably 20 to 40 wt %, although not limited thereto.

[Water]

The anti-fogging agent composition of the present invention may optionally contain water. When the anti-fogging agent composition of the present invention contains water, the water content is, for example, 1 to 95 wt %, preferably 10 to 90 wt %, and more preferably 40 to 75 wt %, although not limited thereto.

[Surface Tension]

While the surface tension of the anti-fogging agent composition of the present invention is not limited, the composition may have a surface tension at 25° C. of 30.0 mN/m or less, for example. From the viewpoint of imparting superior anti-fogging properties and application uniformity, the surface tension at 25° C. is preferably 1 to 28 mN/m, more preferably 5 to 27 mN/m, and even more preferably 10 to 25 mN/m. As used herein, the surface tension refers to the value measured in an environment at 25° C., using the Wilhelmy method with a platinum plate.

[Other Components]

Besides the above-mentioned components, the anti-fogging agent composition of the present invention may also optionally contain fragrances, surfactants other than fluorosurfactants, cooling agents, preservatives, disinfectants, thickeners, pH adjusters, UV absorbers, and the like.

[Applications]

The anti-fogging agent composition of the present invention is used to impart anti-fogging properties to a hard surface. Examples of types of hard surfaces to which the anti-fogging agent composition of the present invention can be applied include, but are not limited to, transparent hard surfaces, such as those of eyewear lenses, smartphone screens, glasses of watch, personal computer or TV screens, and mirrors. Preferred among these applications are eyewear lenses.

As used herein, the term "eyewear" refers to a device worn around the eyes for correcting the eyes, protecting the eyes, or decorating the area around the eyes, for example. Examples of types of eyewear lenses to which the anti-fogging agent composition of the present invention can be applied include, but are not limited to, eyeglass lenses, sunglass lenses, safety goggles, shields, athletic goggles, and contact lenses. Preferred among these are eyeglass lenses, sunglass lenses, safety goggles, shields, and athletic goggles, more preferred are eyeglass lenses, sunglass lenses, safety goggles, and shields, even more preferred are eyeglass lenses and sunglass lenses, and particularly preferred are eyeglass lenses.

To impart anti-fogging properties to a hard surface by using the anti-fogging agent composition of present invention, the anti-fogging agent composition of the present invention may be applied to the hard surface. Examples of methods of applying the anti-fogging agent composition of the present invention to a hard surface include, but are not limited to, a method in which the anti-fogging agent composition of the present invention is spread on the hard surface by using a sheet for anti-fogging having a base sheet impregnated with the composition; and a method in which the anti-fogging agent composition of the present invention is applied or sprayed to the hard surface, and then wiped off with a dry cloth, tissue paper, or the like. The sheet for anti-fogging having a base sheet impregnated with the anti-fogging agent composition of the present invention is excellent in terms of portability, ease of application, ease of removing attached contaminants, and the like, and thus, the method using the sheet for anti-fogging is suitable as a method of applying the anti-fogging agent composition of the present invention to a hard surface. The sheet for anti-fogging will be described later.

The amount of the anti-fogging agent composition of the present invention to be applied to a hard surface may be adjusted appropriately according to the type and the area of the hard surface, the degree of the anti-fogging properties to be imparted, and the like.

In addition to imparting anti-fogging properties to a hard surface, the anti-fogging agent composition of the present invention is also suitable for wiping off contaminants attached to the hard surface, and thus, can also be used for hard surface cleaning applications. In particular, the anti-fogging agent composition of the present invention can remove contaminants attached to an eyewear lens while imparting anti-fogging properties to the eyewear lens, and thus, can be suitably used as an anti-fogging cleaning agent to be applied to an eyewear lens.

2. Sheet for Anti-Fogging

A sheet for anti-fogging of the present invention comprises the above-described anti-fogging agent composition and a base sheet, wherein the base sheet is impregnated with the anti-fogging agent composition. The sheet for anti-fogging of the present invention can also easily wipe off contaminants attached to a hard surface, and thus, can also be suitably used for the purpose of cleaning a hard surface. The sheet for anti-fogging of the present invention can remove contaminants attached to an eyewear lens while imparting anti-fogging properties to the eyewear lens, and thus, can also be suitably used as an anti-fogging eyewear lens cleaner.

The base sheet to be used for the sheet for anti-fogging of the present invention is not limited as long as it is a sheet-like material that can be impregnated with the anti-fogging agent composition, and may be either paper or a fabric. When a fabric is used, it may be either a woven fabric or a nonwoven fabric. Preferred among these base sheets is a nonwoven fabric, which can be sufficiently impregnated with the anti-fogging agent composition.

When the base sheet is a fabric, examples of fibers constituting the fabric include, but not limited to, cellulose fibers, such as cotton and pulp; regenerated fibers; chemical fibers, such as polyethylene, polypropylene, polyester, acrylic, and nylon; and mixed fibers thereof.

The amount of the anti-fogging agent composition to be impregnated into the sheet for anti-fogging of the present invention may be adjusted appropriately according to the type and the like of the base sheet used; for example, an eyeglass cleaning agent composition is used in an amount of, for example, 50 to 300 wt parts, preferably 60 to 100 wt parts, per 100 wt parts of the base sheet.

EXAMPLES

The present invention will be next described in more detail with reference to examples, although the present invention is in no way limited to these examples.

The types, trade names, and the like of the surfactants used in the following examples and comparative examples are as follows.

Nonionic fluorosurfactant 1: 3,3,4,4,5,5,6,6,7,7,8,8,8-tridecafluorooctyl ethylene oxide adduct Nonionic fluorosurfactant 2: perfluoroalkyl ethylene oxide adduct Nonionic fluorosurfactant 3: trade name "Thetawet 8150" (Innovative Chemical Technologies, Inc.); the content of the nonionic fluorosurfactant 3 shown in the tables below represents the content of the nonionic fluorosurfactant itself contained in "Thetawet 8150".

Cationic fluorosurfactant 1: a quaternary ammonium salt fluorosurfactant with a perfluoroalkenyl group Anionic fluorosurfactant 1: sodium perfluoroalkenyl sulfonate Anionic fluorosurfactant 2: an anionic fluorosurfactant with a structure different from that of the anionic fluorosurfactant 1

Amphoteric fluorosurfactant 1: trade name "SURFLON S-233" (AGC Seimi Chemical Co., Ltd.); the content of the amphoteric fluorosurfactant 1 shown in the tables below represents the content of the amphoteric fluorosurfactant itself contained in "SURFLON S-233".

Amphoteric surfactant 1: lauryl hydroxysulfobetaine

Test Example 1

1. Test Method

Anti-fogging agent compositions for eyeglass lenses with the compositions shown in Tables 1 to 4 were prepared. The resulting anti-fogging agent compositions were evaluated for application uniformity and anti-fogging effect, using the following methods.

<Method of Evaluating Application Uniformity>

A wiper (10 cm×13 cm, "Kaydry Wiper"; Nippon Paper Crecia Co., Ltd.) was folded in four, 50 μl of the anti-fogging agent composition was impregnated into the center of the wiper, and the composition was applied to the concave surface of an eyeglass lens (water repellent coated lens, refractive index 1.60, "SL 982 VP"; HOYA Corporation), by gently spreading it five times in a to-and-fro direction. After the application, application uniformity was evaluated according to the following evaluation criteria.

Evaluation Criteria for Application Uniformity

A: Easy to spread, and can be spread evenly and uniformly.

B: Easy to spread, and can be spread substantially uniformly with only slight unevenness.

C: Difficult to spread, and becomes somewhat uneven.

D: Difficult to spread, and becomes uneven.

<Method of Evaluating Anti-Fogging Effect>

A wiper (10 cm×13 cm, "Kaydry Wiper"; Nippon Paper Crecia Co., Ltd.) was folded in four, 50 μl of the anti-fogging agent composition was impregnated into the center of the wiper, and the composition was applied to the concave surface of an eyeglass lens (water repellent coated lens, refractive index 1.60, "SL 982 VP"; HOYA Corporation), by gently spreading it five times in a to-and-fro direction. The lens thus coated with the anti-fogging agent composition was fixed 5 cm above the surface of warm water kept warm at 34° C., and allowed to stand for 5 minutes. Here, the lens was placed with the surface coated with the anti-fogging agent composition face down, i.e., on the side directly in contact with vapor of the warm water. After letting the lens stand undisturbed for 5 min, the appearance of the lens was observed, and the degree of fogging was evaluated according to the following evaluation criteria. For reference, FIG. 1 shows photographs of the observed appearances of lenses that meet the respective evaluation criteria.

Evaluation Criteria for Anti-Fogging Effect

AA: No fogging and clear.

A: Almost no fogging and clear.

B: Fogging occurs, but the back of the lens is visible.

C: Much fogging occurs, and the back of the lens is invisible.

2. Test Results

The results are shown in Tables 1 to 4. Even if the composition contains a fluorosurfactant, if it does not contain a glycol ether, the composition is not satisfactory both in terms of application uniformity and anti-fogging effect (Comparative Examples 1 to 5, 13, and 14). Moreover, if the composition does not contain a fluorosurfactant, and contains a glycol ether, the composition is inferior in terms of application uniformity and anti-fogging effect (Comparative Examples 6 and 7). Furthermore, even if the composition contains a fluorosurfactant and a glycol ether, if the content of the glycol ether is above 10 wt %, the composition is unsatisfactory in terms of application uniformity and anti-fogging effect (Comparative Examples 8 to 12 and 15 to 17). In contrast, if the composition contains a fluorosurfactant and a glycol ether, and the content of the glycol ether is 10 wt % or less, the composition has satisfactory application uniformity and an excellent anti-fogging effect (Examples 1 to 30).

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Nonionic fluorosurfactant 1 | 0.5 | 1.0 | 1.0 | 1.0 | 1.0 | — | — | — | — | — | — | — | — |
| Cationic fluorosurfactant 1 | — | — | — | — | — | 1.0 | 1.0 | 1.0 | 1.0 | — | — | — | — |
| Anionic fluorosurfactant 1 | — | — | — | — | — | — | — | — | — | 1.0 | 1.0 | 1.0 | 1.0 |

TABLE 1-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Propylene glycol monomethyl ether | 3 | 0.5 | 3 | 5 | 10 | 0.5 | 3 | 5 | 10 | 0.5 | 3 | 5 | 10 |
| Isopropanol | 30 | 30 | 30 | 30 | 30 | 30 | 30 | 30 | 30 | 30 | 30 | 30 | 30 |
| Water | balance | balance | balance | balance | balance | balance | balance | balance | balance | balance | balance | balance | balance |
| Total (wt %) | 100 | 100 | 100 | 100 | 100 | 100 | 100 | 100 | 100 | 100 | 100 | 100 | 100 |
| Application uniformity | A | A | A | A | A | A | A | A | A | A | A | A | A |
| Anti-fogging effect (5 times of to-and-fro application operations) | A | AA | AA | AA | AA | AA | AA | AA | AA | AA | AA | AA | A |

TABLE 2

| | Examples | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Anionic fluorosurfactant 1 | — | — | — | — | — | — | — | — | — | — | 1.0 | 1.0 |
| Nonionic fluorosurfactant 3 | 1.0 | 1.0 | 1.0 | 1.0 | — | — | — | — | — | — | — | — |
| Anionic fluorosurfactant 2 | — | — | — | — | 1.0 | 1.0 | 1.0 | 1.0 | — | — | — | — |
| Amphoteric fluorosurfactant 1 | — | — | — | — | — | — | — | — | 1.0 | 1.0 | — | — |
| Propylene glycol monomethyl ether | 0.5 | 3 | 5 | 10 | 0.5 | 3 | 5 | 10 | 3 | 10 | — | 3 |
| Dipropylene glycol monomethyl ether | — | — | — | — | — | — | — | — | — | — | 3 | — |
| Isopropanol | 30 | 30 | 30 | 30 | 30 | 30 | 30 | 30 | 30 | 30 | 30 | — |
| Ethanol | — | — | — | — | — | — | — | — | — | — | — | 30 |
| Water | balance | balance | balance | balance | balance | balance | balance | balance | balance | balance | balance | balance |
| Total (wt %) | 100 | 100 | 100 | 100 | 100 | 100 | 100 | 100 | 100 | 100 | 100 | 100 |
| Application uniformity | A | A | A | A | A | A | A | A | A | A | A | A |
| Anti-fogging effect (5 times of to-and-fro application operations) | AA | AA | AA | AA | AA | AA | AA | AA | AA | A | AA | A |

TABLE 3

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Nonionic fluorosurfactant 1 | 0.5 | — | — | — | — | — | — | 0.5 | — | — | — | — |
| Cationic fluorosurfactant 1 | — | 1.0 | — | — | — | — | — | — | 1.0 | — | — | — |
| Anionic fluorosurfactant 1 | — | — | 1.0 | — | — | — | — | — | — | 1.0 | — | — |
| Nonionic fluorosurfactant 3 | — | — | — | 1.0 | — | — | — | — | — | — | 1.0 | — |
| Anionic fluorosurfactant 2 | — | — | — | — | 1.0 | — | — | — | — | — | — | 1.0 |
| Propylene glycol monomethyl ether | — | — | — | — | — | 3 | 17.5 | 17.5 | 17.5 | 17.5 | 17.5 | 17.5 |
| Isopropanol | 30 | 30 | 30 | 30 | 30 | 30 | 30 | 30 | 30 | 30 | 30 | 30 |
| Water | balance | balance | balance | balance | balance | balance | balance | balance | balance | balance | balance | balance |
| Total (wt %) | 100 | 100 | 100 | 100 | 100 | 100 | 100 | 100 | 100 | 100 | 100 | 100 |
| Application uniformity | B | B | B | B | B | B | C | C | C | C | C | C |
| Anti-fogging effect (5 times of to-and-fro application operations) | C | C | C | C | C | C | C | C | C | C | C | C |

TABLE 4

| | Examples | | | | | Comparative Examples | | | | |
|---|---|---|---|---|---|---|---|---|---|---|
| | 26 | 27 | 28 | 29 | 30 | 13 | 14 | 15 | 16 | 17 |
| Nonionic fluorosurfactant 2 | 1.0 | 1.0 | — | — | — | — | — | — | — | — |
| Cationic fluorosurfactant 1 | — | — | 1.0 | — | — | 1.0 | — | 1.0 | — | — |
| Anionic fluorosurfactant 1 | 1.0 | — | — | 1.0 | 1.0 | — | 1.0 | — | 1.0 | 1.0 |
| Amphoteric fluorosurfactant 1 | — | 1.0 | 1.0 | 1.0 | — | 1.0 | 1.0 | 1.0 | 1.0 | — |
| Amphoteric surfactant 1 | — | — | — | — | 0.45 | — | — | — | — | 0.45 |
| Propylene glycol monomethyl ether | 3.0 | 3.0 | 3.0 | 3.0 | 3.0 | — | — | 17.5 | 17.5 | 17.5 |
| Isopropanol | 30 | 30 | 30 | 30 | 30 | 30 | 30 | 30 | 30 | 30 |
| Water | balance | balance | balance | balance | balance | balance | balance | balance | balance | balance |
| Total (wt %) | 100 | 100 | 100 | 100 | 100 | 100 | 100 | 100 | 100 | 100 |
| Application uniformity | A | A | A | A | A | B | B | C | C | C |
| Anti-fogging effect (5 times of to-and-fro application operations) | A | A | A | AA | AA | C | A | C | C | C |

What is claimed is:

1. An anti-fogging agent composition comprising a fluorosurfactant and a glycol ether, wherein:

the content of the glycol ether is 10 wt % or less, the content of the fluorosurfactant is 1.0 to 20 wt %, and the glycol ether is at least one member selected from the group consisting of monoalkylene glycol monoalkyl ethers, esters of monoalkylene glycol monoalkyl ethers, trialkylene glycol monoalkyl ethers, and monoalkylene glycol monoaryl ethers.

2. The anti-fogging agent composition according to claim 1, wherein the composition further contains a monohydric lower alcohol.

3. The anti-fogging agent composition according to claim 2, wherein the monohydric lower alcohol is isopropanol and/or ethanol.

4. The anti-fogging agent composition according to claim 1, wherein the composition is applied to an eyewear lens.

5. A sheet for anti-fogging comprising the anti-fogging agent composition according to claim 1 and a base sheet, wherein the base sheet is impregnated with the anti-fogging agent composition.

6. The sheet for anti-fogging according to claim 5, which is applied to an eyewear lens.

7. A method of preventing fogging on a hard surface, comprising applying the anti-fogging agent composition according to claim 1 to the hard surface.

8. The method of preventing fogging on a hard surface according to claim 7, wherein the hard surface is that of an eyewear lens.

* * * * *